(12) United States Patent  
Doucet et al.

(10) Patent No.: US 8,773,303 B2  
(45) Date of Patent: Jul. 8, 2014

(54) POSITION TRACKING DEVICE AND METHOD

(75) Inventors: Ken Doucet, Dartmouth (CA); Ulrich Vollath, Ismaning (DE)

(73) Assignee: Trimble Navigation Limited, Sunnyvale, CA (US)

( * ) Notice: Subject to any disclaimer, the term of this patent is extended or adjusted under 35 U.S.C. 154(b) by 655 days.

(21) Appl. No.: 12/451,513

(22) PCT Filed: Jun. 22, 2007

(86) PCT No.: PCT/EP2007/056250  
§ 371 (c)(1),  
(2), (4) Date: Feb. 22, 2010

(87) PCT Pub. No.: WO2009/000314  
PCT Pub. Date: Dec. 31, 2008

(65) Prior Publication Data  
US 2010/0141515 A1    Jun. 10, 2010

(30) Foreign Application Priority Data  
Jun. 22, 2007    (WO) .................. PCT/EP2007/056250

(51) Int. Cl.  
*G01S 19/42*    (2010.01)

(52) U.S. Cl.  
USPC .................................................... 342/357.25

(58) Field of Classification Search  
None  
See application file for complete search history.

(56) References Cited

U.S. PATENT DOCUMENTS

| 5,477,458 A | 12/1995 | Loomis |
| 5,512,905 A | 4/1996 | Nichols et al. |
| 5,519,620 A | 5/1996 | Talbot et al. |

(Continued)

FOREIGN PATENT DOCUMENTS

| EP | 1 262 789 A2 | 4/2002 |
| EP | 1 262 789 A | 12/2002 |

(Continued)

OTHER PUBLICATIONS

M. Efe et al., A Tracking Algorithm for Both Highly Maneuvering and Nonmaneuvering Targets, Proceedings of the 36th Conference on Decision & Control, San Diego, California USA, Dec. 1999, pp. 3150-3155.

(Continued)

*Primary Examiner* — Harry Liu  
(74) *Attorney, Agent, or Firm* — Bruce D Riter

(57) ABSTRACT

The present application relates to tracking a position of a device, e.g. for detecting slow and rapid earth deformation, by making use of a recursive filter having the filter characteristic adapted to a detected type of motion. If the motion of the position tracking device is rapid, the filter characteristic is set such that the rapid motion can be tracked with the necessary speed. On the other hand, if the motion is slow, e.g. during times of a normal tectonic drift, the filter characteristic is set such that the motion is slowly tracked with the advantage of efficient noise reduction, i.e. noise in the input signal is effectively barred and does not pass through the filter to the output signal. Thus, in times of rapid motion the convergence speed of the filter output signal to the input signal is set high for fast convergence and in times of slow motion the convergence speed of the filter output signal to the input signal is set low for a slow convergence. The filter may be a Kalman filter.

33 Claims, 7 Drawing Sheets

(56) References Cited

U.S. PATENT DOCUMENTS

| | | | |
|---|---|---|---|
| 5,572,218 A | | 11/1996 | Cohen et al. |
| 5,590,043 A | * | 12/1996 | McBurney ............... 701/470 |
| 5,740,048 A | * | 4/1998 | Abel et al. ............... 701/470 |
| 5,828,336 A | | 10/1998 | Yunck et al. |
| 5,867,411 A | * | 2/1999 | Kumar ............... 708/300 |
| 5,991,691 A | | 11/1999 | Johnson |
| 5,999,123 A | | 12/1999 | Disselkoen et al. |
| 6,198,430 B1 | | 3/2001 | Hwang et al. |
| 6,324,473 B1 | | 11/2001 | Eschenbach |
| 6,397,147 B1 | | 5/2002 | Whitehead |
| 6,453,238 B1 | * | 9/2002 | Brodie et al. ............... 701/472 |
| 6,490,524 B1 | | 12/2002 | White et al. |
| 6,529,830 B1 | | 3/2003 | Eschenbach |
| 6,664,923 B1 | | 12/2003 | Ford |
| 6,741,935 B1 | | 5/2004 | Eschenbach |
| 6,810,324 B1 | | 10/2004 | Nadkarni |
| 6,879,283 B1 | | 4/2005 | Bird et al. |
| 6,934,632 B2 | | 8/2005 | Hatch |
| 7,119,741 B2 | | 10/2006 | Sharpe et al. |
| 7,126,527 B1 | | 10/2006 | Bajikar |
| 7,193,559 B2 | | 3/2007 | Ford et al. |
| 7,312,747 B2 | | 12/2007 | Vollath et al. |
| 7,432,853 B2 | | 10/2008 | Vollath |
| 7,498,979 B2 | | 3/2009 | Liu et al. |
| 7,511,661 B2 | | 3/2009 | Hatch et al. |
| 7,538,721 B2 | | 5/2009 | Vollath et al. |
| 7,576,690 B2 | | 8/2009 | Vollath |
| 7,589,668 B2 | | 9/2009 | Vollath et al. |
| 7,692,578 B2 | | 4/2010 | Vollath et al. |
| 7,746,272 B2 | | 6/2010 | Vollath |
| 7,755,542 B2 | | 7/2010 | Chen et al. |
| 7,868,820 B2 | | 1/2011 | Kolb |
| 7,982,667 B2 | | 7/2011 | Vollath et al. |
| 2004/0066335 A1 | | 4/2004 | Ashjaee |
| 2005/0192027 A1 | | 9/2005 | Kim et al. |
| 2007/0182628 A1 | | 8/2007 | Pomerantz et al. |
| 2008/0238765 A1 | | 10/2008 | Zhang et al. |
| 2009/0184868 A1 | | 7/2009 | Liu et al. |
| 2009/0184869 A1 | | 7/2009 | Talbot et al. |
| 2010/0141515 A1 | | 6/2010 | Doucet et al. |
| 2010/0253575 A1 | | 10/2010 | Vollath |
| 2011/0140959 A1 | | 6/2011 | Vollath |
| 2011/0148698 A1 | | 6/2011 | Vollath |
| 2011/0156949 A1 | | 6/2011 | Vollath et al. |

FOREIGN PATENT DOCUMENTS

| | | |
|---|---|---|
| WO | 2005/045463 A1 | 5/2005 |
| WO | 2007/032947 A1 | 3/2007 |
| WO | 2008/008099 A2 | 1/2008 |
| WO | 2008/048242 A2 | 4/2008 |
| WO | 2008/051201 A2 | 5/2008 |
| WO | 2008/054371 A2 | 5/2008 |
| WO | 2009/000314 A1 | 12/2008 |
| WO | WO 2009/000314 A1 | 12/2008 |
| WO | 2009/056363 A1 | 5/2009 |
| WO | 2009/058213 A2 | 5/2009 |
| WO | 2010/021656 A2 | 2/2010 |
| WO | 2010/021657 A2 | 2/2010 |
| WO | 2010/021658 A2 | 2/2010 |
| WO | 2010/021659 A2 | 2/2010 |
| WO | 2010/021660 A2 | 2/2010 |
| WO | 2010/042441 A1 | 4/2010 |
| WO | 2010/096158 A2 | 8/2010 |
| WO | 2010/096159 A2 | 8/2010 |
| WO | 2010/096190 A2 | 8/2010 |
| WO | 2011/034614 A2 | 3/2011 |
| WO | 2011/034615 A2 | 3/2011 |
| WO | 2011/034616 A2 | 3/2011 |
| WO | 2011/034617 A2 | 3/2011 |
| WO | 2011/034624 A2 | 3/2011 |

OTHER PUBLICATIONS

A. El-Rabbany, Introduction to GPS, 2d Ed., 2006, Chapter 5, pp. 65-82.

T. Ford et al., New Positioning Filter: Phase Smoothing in the 5 Position Domain, Proceedings of the 15th International Technical Meeting of the Satellite Division of the Institute of Navigation Ion GPS 2002, Sep. 24-27, 2002, Portland, Oregon, pp. 1850-1862.

B. Hofmann-Wellenhof et al., Global Positioning System Theory and Practice, Second Edition, 1993, pp. 115-118.

J. Kouba, A Guide to Using International GPS Service (IGS) Products, Version 21, Geodetic Survey Division, Natural Resources Canada, 2003, 2009 (34 pages).

D. Kozlov et al., Flying RTK Solution as Effective Enhancement of Conventional Float RTK, Ion GNSS 20th International Technical Meeting of the Satellite Division, Sep. 25-28, 2007, Fort Worth, TX, pp. 351-356.

H. Landau et al., Virtual Reference Stations versus Broadcast Solutions in Network RTK—Advantages and Limitations, GNSS 2003, Apr. 2003, Graz, Austria (15 pages).

P. McBurney, A Robust Approach to Reliable Real-Time Kalman Filtering, IEEE Position Location and Navigation Symposium, Mar. 20-23, 1990, pp. 549-556.

P. Misra et al., Global Positioning System: Signals, Measurements, and Performance, Second Edition, 2006, ISBN 0-9709544-1-7, pp. 146-232.

Navstar Global Positioning System Interface Specification IS-GPS-200, Revision D, Dec. 7, 2004, GPS Joint Program Office (207 pages).

G. Seeber, Satellite Geodesy, 2nd Edition, 2003, pp. 269-276.

G. Seeber, Satellite Geodesy, 2nd Edition, 2003, pp. 289-295.

P. Teunissen, Theory of Integer Equivariant Estimation with Application to GNSS, Journal of Geodesy, vol. 77, No. 7-8, Oct. 2003, pp. 402-410.

P. Teunissen, GNSS Best Integer Equivariant Estimation, International Association of Geodesy Symposia, 2005, vol. 128, Symposium G04, pp. 422-427.

P. Teunissen et al.; GNSS Carrier Phase Ambiguity Resolution: Challenges and Open Problems, in M.G. Sideris (ed.); Observing Our Changing Earth, International Association of Geodesy Symposia 133, 2009, pp. 785-792.

J. Traugott et al., Time Differences for Kinematic Positioning with Low-Cost Receivers, GPS World, May 1, 2008 (1 page).

J. Traugott et al. A Time-Relative Approach for Precise Positioning with a Miniaturized L1 GPS Logger, Ion-GNSS 2008, 21st International Technical Meeting of the US Institute of Navigation, Satellite Division, Sep. 16-19, Savannah, GA, pp. 1883-1894.

Trimble Survey Controller Field Guide, Version 7.50, Part No. 32969-50-ENG, Revision A, Nov. 1999 (120 pages).

Trimble Introduces New Rugged Smart Antenna for Next Generation Grade Control Systems, Trimble Navigation Limited Press Release, Feb. 7, 2006 (2 pages).

Trimble MS990 GNSS Receiver Release Notes, Version 4.12, Revision A, Dec. 2009 (16 pages).

S. Verhagen, The GNSS integer ambiguities: estimation and validation, Publications on Geodesy 58, Delft, 2005, 194 pages, ISBN-13: 978 90 6132 290 0.

Efe M et al.: "A tracking algorithm for both highly maneuvering and nonmaneuvering targets" Decision and Control, 1997., Proceedings of the 36th IEEE Conference on San Diego, CA, USA Dec. 10-12, 1997, New York, NY, USA, IEEE, US, vol. 4, Dec. 10, 1997, pp. 3150-3155, XP010266198 ISBN: 0-7803-4187-2.

McBurney P W: "A robust approach to reliable real-time Kalman filtering" IEEE, Mar. 20, 1990, pp. 549-556, XP010001177.

International Search Report in PCT/EP2007/056250, mailed Mar. 19, 2008, 3 pages.

International Preliminary Report on Patentability in PCT/EP2007/056250, issued Dec. 22, 2009, 9 pages.

\* cited by examiner

POSITION TRACKING DEVICE AND METHOD

FIELD OF THE INVENTION

The present application relates to tracking a position of a device, e.g. for detecting slow and rapid earth deformation.

BACKGROUND OF THE INVENTION

Various types of positioning systems are known in the art. For example, satellite navigation systems provide autonomous geospatial positioning with global coverage. A global navigation satellite system (GNSS) allows GNSS receivers to determine their location on the earth using signals transmitted from satellites, including longitude, latitude and altitude, to within a few meters or even centimeters.

For example, orbiting satellites broadcast their precise orbital data containing the position of the satellite and the precise time when the signal was transmitted. The position of the satellite may be transmitted in a data message that is superimposed on a code that serves as a timing reference. The receiver can then compare the time of broadcast encoded in the transmission with the time of reception measured by an internal clock, thereby measuring the time of flight to the satellite. Several such measurements can be made at the same time to different satellites, allowing a precise determination of the position of the receiver.

Each individual distance measurement made by the receiver traces the receiver on the surface of a spherical shell at the measured distance from the satellite. By taking several such measurements and determining an intersecting point of the spherical shells, a position fix can be generated. Generally, with the latitude, longitude, altitude and time unknown, i.e. four unknown parameters, signals from four satellites are needed for a precise position determination.

A common and well known application of such global positioning systems is to use a satellite navigation system receiver to determine the position of a vehicle, a person, etc.

Moreover, it is known to use satellite navigation system receivers in measuring very slow motion, for example tectonic drift, to track the slow movement or deformation of continents. By deploying a network of satellite navigation system receivers, maps of the tectonic changes of the earth surface can be generated.

However, certain events may disturb the slow drift that is tracked by the satellite navigation system receivers, and it is required to assess such disturbances. For example, earthquakes or landslides may cause large movements or deformations of the earth surface over a very short period of time as compared to the slow tectonic drifts.

In order to comprehensively monitor slow earth deformation or other types of slow movements with sudden rapid changes, a system capable of handling both types of motion is required, e.g. a slow tectonic drift and sudden movements caused by earthquakes, landslides, etc.

In the absence of rapid motion a variety of filter techniques to obtain sufficient accuracy is known, but to also track rapid motion a filter is needed with a sufficient dynamic range such as the known real time kinematic (RTK) filter. One problem with known RTK solutions is, however, that high accuracies can only be obtained when carrier phase ambiguities can be resolved. Carrier phase ambiguities result from the fact that a position determination in an RTK filter based system uses a phase of a carrier wave. However, the phase of a wave is ambiguous as the same phase reoccurs with each oscillation of the carrier signal. In RTK filter solutions carrier phase ambiguities restrict position tracking systems to networks with a satellite navigation receiver spacing below e.g. 100 kilometers. Moreover, with RTK filters solutions problems occur with multipath propagation.

SUMMARY OF THE INVENTION

It is therefore desirable to provide for position tracking with improved accuracy in the presence of slow and rapid motion.

A solution is provided by a position tracking device, including means for receiving positioning signals from a plurality of satellites at known positions; means for determining a position estimate using a recursive filter adapted to receive as an input the positioning signals and a convergence parameter; means for obtaining a displacement estimate of the position tracking device; wherein the means for determining the position estimate is adapted to adjust the convergence parameter based on the displacement estimate.

According to an advantageous embodiment, the recursive filter is a Kalman filter and wherein the convergence parameter is constituted by a position noise input to the Kalman filter.

According to another advantageous embodiment, the convergence parameter is constituted by the displacement estimate multiplied by a constant.

According to another advantageous embodiment, the displacement estimate is determined based on a time sequence of displacement measurements.

According to another advantageous embodiment, the displacement estimate is determined based on at least one of
  a phase of the positioning signals from the satellites; and
  a signal from a motion sensor.

According to another advantageous embodiment, the displacement estimate is based on a velocity vector describing a movement of the position tracking device.

According to another advantageous embodiment, the convergence parameter is set to a value indicating slow convergence, if the displacement estimate is below a predetermined detect threshold, and to set the convergence parameter to a value indicating fast convergence, if the displacement estimate exceeds the predetermined detect threshold.

According to another advantageous embodiment, for indicating fast convergence, the convergence parameter is determined based on the displacement estimate and for indicating slow convergence the convergence parameter is constituted by a predetermined constant.

According to another advantageous embodiment, the position tracking device is adapted to: perform a first recursive filtering process based on a first group of time sequences of positioning signals spaced by a first measurement time interval; perform a second recursive filtering process based on a second group of time sequences of positioning signals spaced by a second measurement time interval longer than the first measurement interval; and use the determination result of the first recursive filtering process, if the displacement estimate exceeds a predetermined threshold, and to use the determination result of the second recursive filtering process, if the displacement estimate is below the predetermined threshold.

According to another advantageous embodiment, the convergence parameter includes covariances of a displacement in different spatial directions.

According to another embodiment, a method is provided for tracking a position, including receiving positioning signals from a plurality of satellites at known positions at a position tracking device; obtaining a displacement estimate of the position tracking device; adjusting a convergence parameter based on the displacement estimate; and determining a position estimate using a recursive filter receiving as an input the positioning signals and the convergence parameter.

According to another embodiment, a program is provided including instructions adapted to cause data processing means to carry out the operations for position tracking.

According to another embodiment, a computer readable medium is provided in which a program is embodied, where the program is to make a computer execute the operations for position tracking.

According to another embodiment, a computer program product is provided comprising the computer readable medium.

According to another embodiment, a system is provided for tracking tectonic drifts including a plurality of position tracking devices.

Further advantageous embodiments are disclosed in further dependent claims.

DETAILED DESCRIPTION OF THE PREFERRED EMBODIMENTS

An embodiment of a position tracking device according to the invention will now be described with reference to FIG. 1.

The present embodiment relates to tracking a position of a device, e.g. for detecting slow and rapid earth deformation, by making use of a recursive filter having the filter characteristic adapted to a detected type of motion. For example, if the motion of the position tracking device is rapid, the filter characteristic is set such that the rapid motion can be tracked with the necessary speed. In this case the output signal of the filter, i.e., the motion estimate, can closely follow the rapidly changing input signal, i.e., the position signals, at the cost of increased noise in the input signal passing through the filter to the output signal. On the other hand, if the motion is slow, e.g. during times of a normal tectonic drift, the filter characteristic is set such that the motion is slowly tracked with the advantage of efficient noise reduction, i.e. noise in the input signal is effectively barred and does not pass through the filter to the output signal. In other words, in times of rapid motion the convergence speed of the filter output signal to the input signal is set high for fast convergence and in times of slow motion the convergence speed of the filter output signal to the input signal is set low for a slow convergence.

Figure 1:
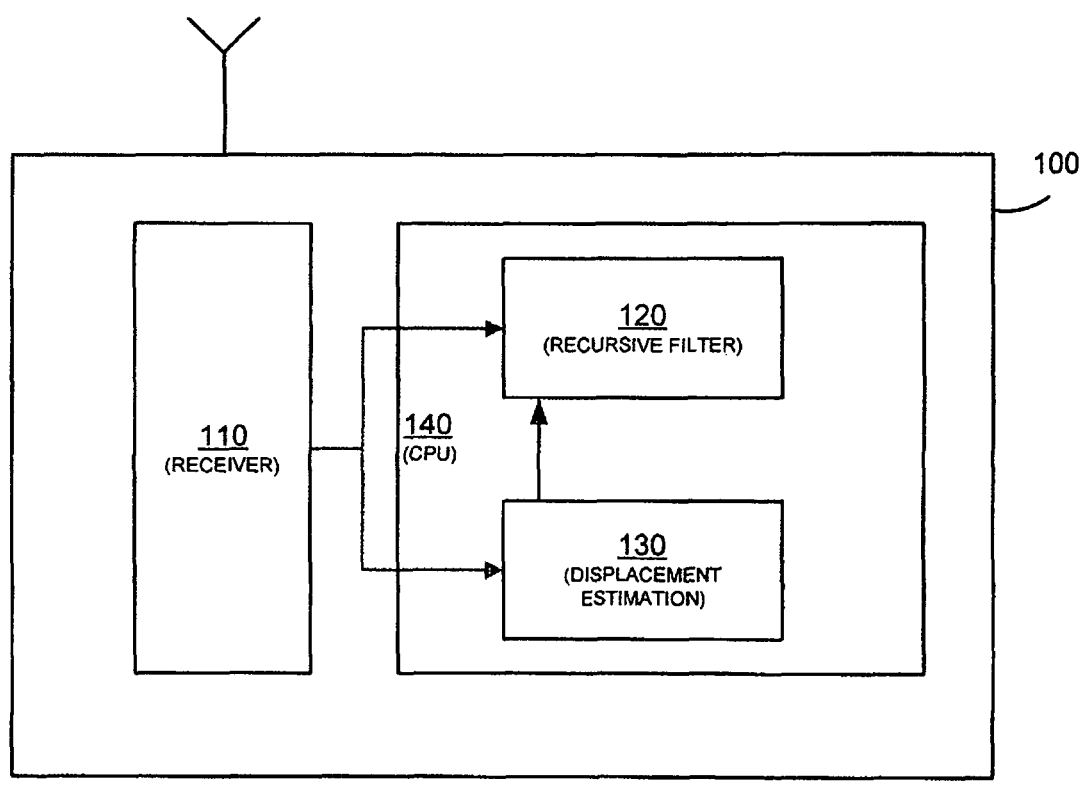
FIG. 1 shows elements of a position tracking device according to an embodiment of the invention.

FIG. 1 schematically illustrates elements of a corresponding position tracking device 100, such as of a navigation satellite system receiver for determining a position of the device on the basis of signals received from a plurality of orbiting satellites.

The position tracking device includes a receiver for receiving positioning signals from a plurality of satellites at known positions. Moreover, the position tracking device includes a filter unit 120 for determining a position estimate using a recursive filter adapted to receive at an input the positioning signals and a convergence parameter. Still further, a displacement estimation unit 130 is provided for obtaining a displacement estimate of the position tracking device indicative of e.g. a sudden motion of the position tracking device due to events such as an earthquake, a landslide, etc.

The filter unit 120 is adapted to adjust the convergence parameter based on the displacement estimate from the displacement estimation unit.

Accordingly, the position tracking device 100 is enabled to react to changing conditions including slow motion during normal operation and rapid motion occurring at unknown points in time. More precisely, the recursive filter may be used to recursively filter a sequence of positioning signals from each of the satellites in order to arrive at a good estimate of the position based on a previous measurement. In the filtering process the convergence parameter is indicative of the convergence speed of the filter, i.e of the ability of the filter to follow more rapid changes of the position of the device. If the convergence parameter is indicative of a fast convergence, actual position measurement more strongly affects the prediction process, whereas if the convergence parameter indicates slow convergence, an actual measurement has less influence on the prediction process.

Accordingly, with the adjusting of the convergence parameter based on the displacement estimate the filtering process and thus the estimation of the position of the position tracking device can be adapted to external conditions such as undisturbed slow motion of the position detecting device due to slow deformations or drifts and the suddenly occurring fast motion due to earthquakes, landslides and similar. In a slow moving environment the convergence parameter indicates slow convergence, helping to track slow motion while avoiding large influence of measurement errors or errors in the detected positioning signals in the estimation process. In a fast moving environment the displacement estimate and thus the convergence parameter indicates fast convergence, helping in the process of tracking fast movements at the cost of higher influence of measurement errors or errors in the detected positioning signals in the estimation process, thus finding a compromise between fast adaptation of the filter to change of measurements and allowing measurement errors to influence the estimation process.

The position tracking device in the present embodiment may be employed for tracking tectonic drifts, such as outlined above, and/or any other kind types of slow and rapid motion, such as of man made structures, e.g. buildings, bridges, barrages, etc.

In the following examples of the elements of the position tracking device 100 of FIG. 1 are described in further detail. It is explicitly noted that the below refers to examples only and should not be construed as limiting the invention.

The position tracking device 100 in one example is constituted by global navigation satellite system receiver deployed in a stationary position on the earth surface. The position tracking device may be arranged to perform all required measurements and calculations to track the position of the device over time, as outlined above, however, it is also conceivable to provide the position tracking device 100 in a distributed manner at different locations. In one example the position tracking device consists of a receiver at a particular stationary location communicating with a central station or remote station using wireless or wirebound communications. The receiver in this example transmits the received signal before or after pre-processing operations to the central or remote station, and the central or remote station performs the required calculations to determine the position estimate using the recursive filter and adjusting the convergence parameter based on the displacement estimate. The displacement estimate may also be calculated at the central or remote station based on signals received from the receiver, or may be determined directly at the receiver. In other words, any kind of distributed or non-distributed arrangement of the individual elements of the position tracking device is conceivable.

Below examples of the receiver 110 will be outlined in further detail. In an example the receiver 110 is formed by a satellite navigation system receiver capable of receiving positioning signals from a plurality of satellites in order to determine a position of the receiver. For example, the receiver is arranged to receive signals from four orbiting satellites in order to calculate the attitude, longitude, altitude and time parameters required for a position determination. The receiver may include hardware and/or software elements, such as an antenna, high frequency circuitry, demodulation circuitry, etc., to receive the positioning signals. Moreover, the receiver may include a central processing unit and a memory storing appropriate programs that, when loaded into the central processing unit of the receiver, enable the receiver to appropriately process the received positioning signals from the plurality of satellites in order to obtain the coordinates of the position of the receiver.

Below examples of the filter unit 120 and the displacement estimation unit 130 will be outlined in further detail. As noted above, the filter unit and the displacement estimation unit cooperate to provide a position estimate on the basis of a previous measurement of the position of the device.

To this purpose the filter unit uses a recursive filter receiving as an input the positioning signals and a convergence parameter. In an example the filter unit is realized as an arrangement including hardware and/or software elements, e.g. a processing unit and a memory storing appropriate program elements that, when loaded into the processing unit, enable the execution of the filter process. Further, it is also conceivable that the recursive filter unit is entirely realized as a hardware arrangement, such as an application specific integrated circuit (ASIC) configured to execute the recursive filter process and configured to receive as an input the positioning signals from the receiver and to receive the convergence parameter.

The displacement estimation unit 130 in an example obtains a displacement estimate of the position tracking device on the basis of the received positioning signals or on the basis of a signal received from a motion detector. The displacement estimation unit may be constituted by hardware and/or software elements such as a processing unit and a memory for storing appropriate program elements to make the processing unit, when loaded with the program elements, perform the displacement estimation process. The displacement estimation unit may also include a motion sensor for detecting a motion or acceleration of the sensor due to rapid movements of the device, or may receive such signals from an external motion sensor provided in association with the position tracking device. Alternatively, the position estimation unit is fully realized as a hardware arrangement such as an ASIC configured to perform the required displacement detection process.

In another example the position tracking unit 100 includes a central processing unit 140 and a memory for storing appropriate program elements to enable the central processing unit, when running the program elements, to execute the functionality of the displacement estimation unit and the filter unit such as detailed above. In yet another embodiment the CPU 140 also integrates at least elements of the receiver 110, thus realizing the functionality of the receiver, the filter unit and the displacement estimation unit 110, 120 and 130.

Figure 2:
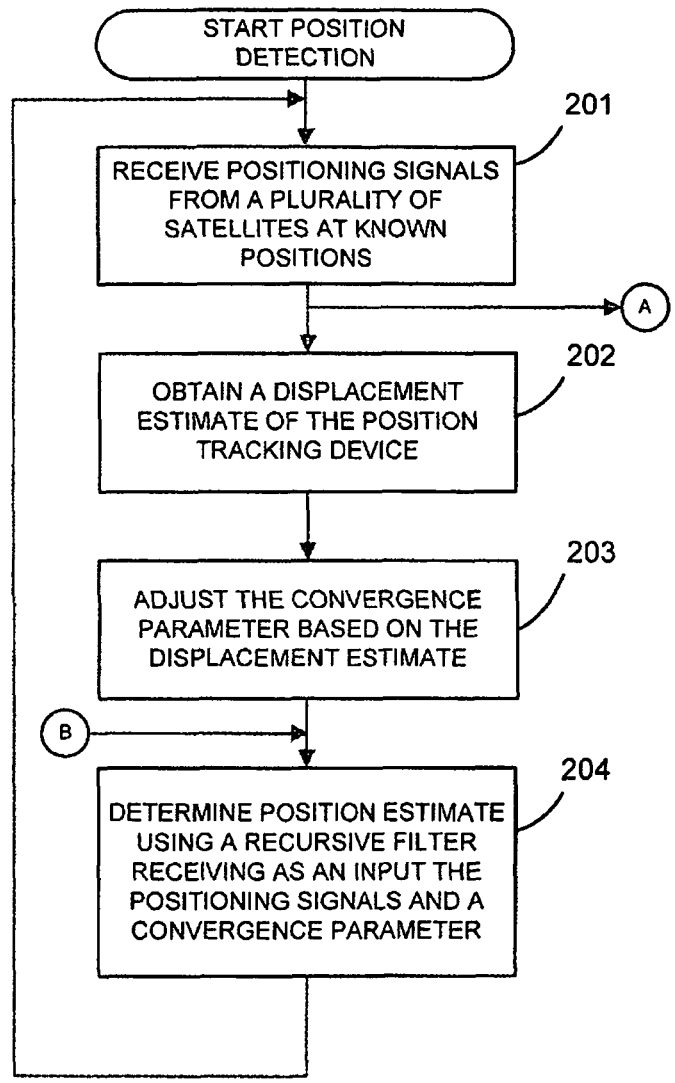
FIG. 2 illustrates operations for tracking a position, for example using the device of FIG. 1, according to an embodiment of the invention.

In the following a further embodiment of the invention will be outlined with regard to FIG. 2. FIG. 2 illustrates operations of a method for determining and tracking a position according to an embodiment of the invention. The operations of FIG. 2 may be carried out using the position tracking device illustrated in FIG. 1, however, FIG. 2 is not limited thereto.

In a first operation 201, starting the position detection or tracking, positioning signals from a plurality of forwarding satellites at known positions are received. For example, orbiting satellites broadcast their precise orbital data containing the position of the satellite and the precise time when the signal was transmitted. As noted above, each individual position signal from a satellite locates the receiver on the surface of a spherical shell at the measured distance from the satellite. By taking several such measurements and determining an intersecting point of the spherical shells, a position fix can be generated. Generally, with four unknown parameters, latitude, longitude, altitude and time, signals from four satellites are needed for a precise position determination. However, if certain assumptions are made, such as constant altitude etc., positioning signals from less than four satellites may be sufficient.

In an example the positioning signals are configured as known in the art, e.g. to enable a phase based position detection. For example, the positioning signals include a carrier wave modulated to indicate a phase and/or time reference and indicating the identity of the satellite setting the positioning signals.

In an operation 202 a displacement estimate of the position tracking device is obtained. The displacement estimate preferably is indicative of a change of a location or position of the tracking device due to motion, e.g. of the earth surface where the tracking device is located, such as due to an earthquake, a landslide and similar. The displacement estimate may indicate acceleration, velocity, or a deviation between a previous position and a current position of the tracking device. In an alternative the displacement estimate is calculated on the basis of the positioning signals, such as by differentiation of the carrier phase of the positioning signal from the plurality of satellites. Still further, a sensor can be used sensing an orientation, speed, acceleration etc. The displacement estimate may also be obtained from an external source, such as an external device connected to the position tracking device or in communication therewith.

In an operation 203 the convergence parameter is then adjusted or updated on the basis of the obtained displacement estimate. In an example, the displacement estimate is directly proportional to the convergence parameter, such that a displacement estimate indicating a large displacement leads to a convergence parameter indicating fast convergence, by allowing larger changes of the position estimate in view of the positioning signals. In other examples, the parameter is obtained by any calculation process receiving the displacement estimate as an output or any other kind of decision process based on the displacement estimate.

It is noted that the operation 203 may be optional, i.e. the convergence parameter may only be updated, if considered necessary. For example, the convergence parameter may be adjusted if the displacement estimate has a certain magnitude or dynamic change over time.

In an operation 204 a position estimate is determined using a recursive filter receiving as an input the positioning signals and a convergence parameter. For example, the filter is a recursive time domain filter for calculating a position estimate based on a previous measurement and a convergence parameter setting the characteristics of the filter in view of a tracking of individual position measurements. The convergence parameter of the filter influences the speed with which a position prediction can follow changes or is allowed to follow changes in the actual measurements as made on the basis of the positioning signals. Usually, if slow motion, i.e. slow changes of the position of the device is expected, the convergence parameter can be set to indicate slow convergence, as in this case the expected changes of the position are small and the prediction result does not need large changes to follow or track the actual position. Vice versa, if large motions are expected or detected, the convergence parameter is preferably set to a value enabling a faster follow-up of the prediction or position estimate, i.e. a quicker tracking of the actual position by allowing larger changes of the position estimate in the filtering process.

Preferably, the filter makes a position estimate on the basis of at least the previous measurement or a plurality of preceding measurements and moreover, the position estimate can be based on modelling a state transition between a previous position estimate and the current position estimated on the basis of actual measurements. The convergence parameter preferably sets the filter characteristics as appropriate, i.e., allowing fast tracking changes or allowing slow tracking changes. The convergence parameter may therefore be viewed as setting the filter characteristic to a low pass characteristic, and imposing a high pass characteristic or a modified low path characteristic when larger motion is expected or detected.

It is note that the recursive filter may be any kind recursive filter, such as a recursive time domain filter.

After operation 204 the flow returns to operation 201 and a next calculation sequence of a position estimate is started.

Preferably, each sequence of operation 201-204 is based on positioning signals received at predetermined instants in time, so that a discrete sequence of position measurements, or epochs, leads to a responding sequence of position estimates. In an example, the cycle of operations 201-204 is executed between 1 to 50 times per second, i.e., positioning signals received from the plurality of satellites are processed 1-50 times per second to determine a position estimate and to adjust the convergence parameter at the same or a lower speed. However, it is noted that any other interval between two cycles of operations 201-204 is possible. Moreover, in another example, the measurement cycle is made dependent on the displacement estimate, so that a faster tracking of the actual position is possible.

In another example, the displacement estimate is used to define a number of times the sequence of operations 201-204 are repeated per second, with a larger displacement estimate leading to a larger number of estimate cycles 201-204. Conversely, a lower displacement estimate can be used to reduce the number of position estimate cycles. Obviously, if slow motion is expected, a lower number of measurement or estimation cycles is needed, whereas upon a rapid movement a larger number of position estimations per given time interval may be needed.

It is noted that while a specific order of operations 201-204 is indicated in FIG. 2, in alternate embodiments other sequences are possible. For example, the operation 202 for obtaining a displacement estimate and the operation 203 for adjusting the convergence parameter may be executed before or after operation 204.

Figure 3:
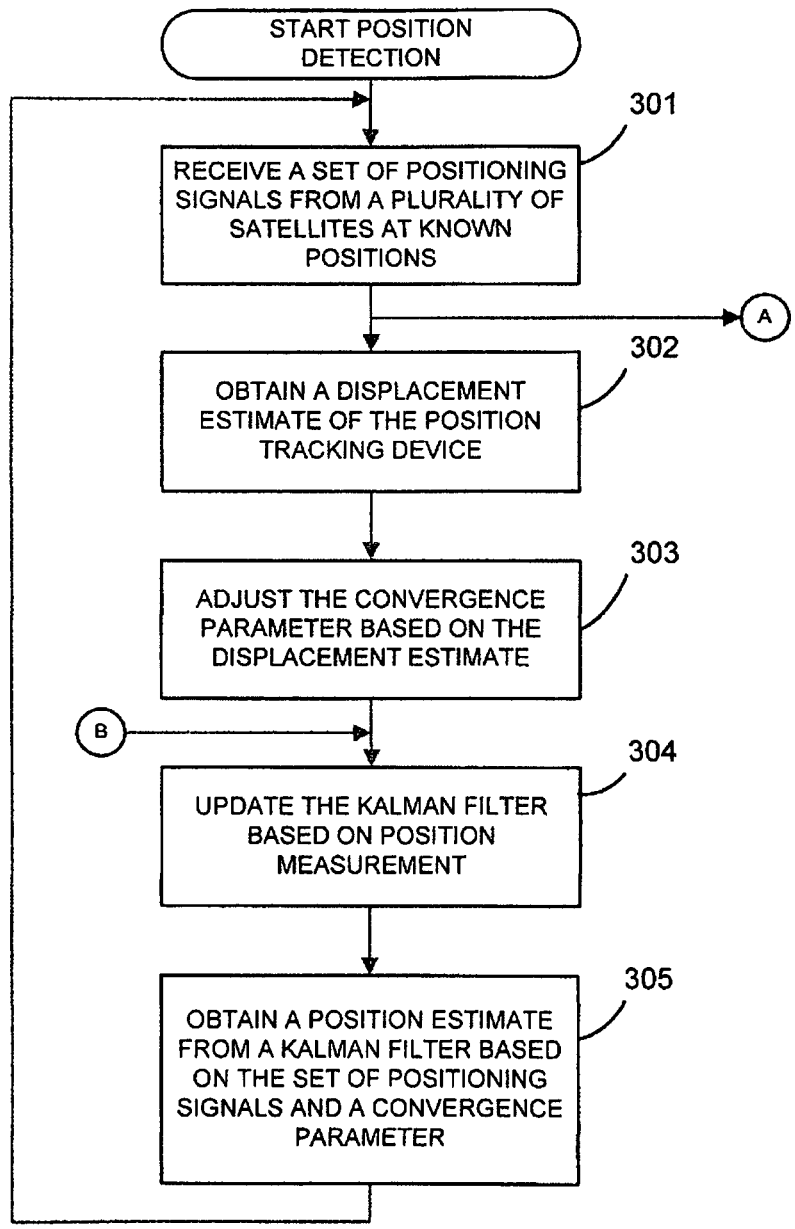
FIG. 3 illustrates operations of a method for tracking a position according to another embodiment of the invention, particularly outlining operations to track a position based on a Kalman filter.

In the following a further embodiment of the invention will be described with regard to FIG. 3. FIG. 3 illustrates elements of a method for tracking the position of e.g. the position tracking device of FIG. 1, however, FIG. 3 is not limited thereto.

As outlined above in detail, a position estimate is determined using a recursive filter receiving as an input the positioning signals from the satellites, e.g. four satellites, and a convergence parameter. The recursive filter may be any kind recursive filter, such as a recursive time domain filter. FIG. 3 now particularly shows a method for position tracking using a Kalman filter as one example of a recursive time domain filter.

Kalman filters are well known in the art. A Kalman filter is an efficient recursive filter that estimates a state of a dynamic system from a series of possibly incomplete and/or noisy measurements. Kalman filters are based on linear dynamical systems discretized in the time domain. A Kalman filter is modelled on a Markoff chain built on linear operators perturbed by Gaussian noise. The Kalman filter uses a system state vector and at each discrete time increment a linear operator is applied to the system state to generate a new state. In this process noise may be mixed in and possibly some information form controls of the modelled system.

The Kalman filter is a recursive estimator in which the estimated state from a previous time step and a current measurement are used to compute an estimate of the current state. In the present case the estimate of the current state is the position estimate of the position of the position tracking device.

The Kalman filter is operated in two steps or phases, namely a predict step and an update step. In the predict step the estimate from the previous time step is used to produce an estimate of the current state, the present situation or position. Thereafter, in an update step actual measurement from the current time step is used to refine the prediction to arrive at a hopefully more accurate estimate. Accordingly, in the predict phase the position estimate is calculated using the Kalman filter on the basis of the previous time step and in the update step the linear operator applied to the state, i.e. position, is updated on the basis of an actual measurement.

The embodiment illustrated with regard to FIG. 3 employs a Kalman filter for tracking the position of the tracking device. In the embodiment the convergence parameter is constituted by a position noise input or component of the Kalman filter, e.g. to be used in the filter update phase. In the Kalman filter the convergence parameter may be constituted by the displacement estimate multiplied by a constant or as outlined with regard to the previous embodiments. The constant generally is a proportionality factor such as a time interval between subsequent epochs or estimations.

In the embodiment of FIG. 3 in a first operation 301, upon commencing the position detection or tracking, a set of positioning signals from a plurality of satellites, e.g. four, at known positions is received. This set of positioning signals may be referred to as the positioning signals of an epoch. A noted before, each satellite sends its positioning signals including a time reference and identity of the satellite and possibly further information, and the position tracking device performs position detection calculations on the basis of the received data. The position detection thus is performed at certain instances in time, usually spaced by a constant time interval or a time interval spacing depending on the detected displacement speed. Thus, a set of positioning signals from the plurality of satellites refers to the positioning signals received at the specified point in time.

In an operation 302 the displacement estimate of the position tracking device is obtained in the current cycle, such as outlined with regard to the remaining embodiments. For example the displacement estimate can be based on the received positioning signals or on external information, such as from an acceleration sensor or similar.

Then, in an operation 303 the convergence parameter is adjusted on the basis of the displacement estimate for the next cycle, such as outlined with regard to previous embodiments.

It is noted that operations 302 and 303 may be performed in the sequence as shown in FIG. 3, i.e., after operation 301, so that the updated convergence parameter can be used in the current cycle for the position prediction, however, it is noted that operations 302 and 303 may also be performed at another time in the cycle, such as before operation 301 or after operation 305.

Then, in an operation 304 the Kalman filter is updated based on the position measurement.

In an operation 305 a position estimate is obtained from the Kalman filter based on the set of positioning signals and the convergence parameter. Thus, the position estimate from the Kalman filter constitutes a prediction of the system state, i.e. the position of the position tracking device and the phase ambiguities. In other words, the predicted state from the Kalman filter includes information on the spatial position of the tracking device and an estimation of the phase ambiguities of the signals from the individual satellites. Moreover, the prediction of the system state depends on the convergence parameter constituting a position noise term for the Kalman filter. This term thus is indicative of possible or expected changes of the distance state, i.e. the position, and thus can be used to adjust the characteristics of the Kalman filter to adapt to varying environments such as slow moving environments or fast moving environments. Preferably, the convergence parameter is set on the basis of a previous cycle of the Kalman filter and thus based on a previous displacement estimate calculated for a previous cycle.

For example the convergence parameter is constituted by a position noise term of the Kalman filter used in the prediction step of the filter as outlined above. In this case the convergence parameter is constituted by a matrix including the variances of the motion in the different spatial directions. By setting the variances, the behaviour of the filter can be influenced. The variances may be set on the basis of the expected motion, for example if in a particular application slow motion in a certain direction is always expected such as due to physical constraints, the associated variance may be set to a low value.

Moreover, it is possible that the convergence parameter includes covariances of a displacement in different spatial directions, to include prior knowledge on the expected motion into the estimation. For example, a movement in one spatial direction may depend on the movement in another direction, also e.g. due to physical constraints.

After operation 305 the flow returns to operation 301, and a next position estimation cycle commences with an operation 301.

The embodiment of FIG. 3 illustrates employing a Kalman filter to perform a position tracking based on satellite positioning signals, including setting a convergence parameter of the Kalman filter based on a detected displacement or motion of the tracking device, in order to adapt the tracking process to the external conditions, i.e. slow movement or deformation of the earth surface, or fast movement due to earthquakes and landslides, etc.

Below another embodiment of the tracking process using a Kalman filter is described.

The Kalman filter is a set of mathematical equations that provide optimal estimates of a state vector, $X_k$, at any given time $t_k$. Furthermore, there are two distinct sets of equations—the prediction equations and the update equations. These are as follows:

Prediction Equations:

$$X_k(-) = \Phi_{k,k-1} X_{k-1}(+) \qquad (1)$$

$$P_k(-) = \Phi_{k,k-1} P_{k-1}(+) \Phi^t_{k,k-1} + Q_{k,k-1} \qquad (2)$$

where
$X_k(-)$ is the predicted state vector at time $t_k$
$\Phi_{k,k-1}$ is the transition matrix between times $t_{k-1}$ and $t_k$
$X_{k-1}(+)$ is the estimated state vector at time $t_{k-1}$
$P_k(-)$ is the predicted state covariance matrix at time $t_k$
$P_{k-1}(+)$ is the estimated state covariance matrix at time $t_{k-1}$
$Q_{k,k-1}$ is the system noise covariance matrix between times $t_{k-1}$ and $t_k$ Update Equations:

$$X_k(+) = X_k(-) + K_k \{ Z_k - H_k X_k(-) \} \qquad (3)$$

$$P_k(+) = \{ I - K_k H_k \} P_k(-) \qquad (4)$$

$$K_k = P_k(-) H^t_k \{ H_k P_k(-) H^t_k + R_k \}^{-1} \qquad (5)$$

where
$X_k(+)$ is the estimated state vector at time $t_k$
$Z_k$ is the measurement vector at time $t_k$
$H_k$ is the design matrix at time $t_k$
$Q_k(+)$ is the estimated state covariance matrix at time $t_k$
$R_k$ is the measurement covariance matrix at time $t_k$ With the above equations it becomes clear that the effect of a new measurement vector, $Z_k$, on the estimated state vector, $X_k(+)$, at time $t_k$ is determined by the Kalman gain matrix, $K_k$, given in equation (5). The gain matrix uses the predicted state covariance matrix, $P_k(-)$, and the measurement covariance matrix, $R_k$, to determine how much weight to give new measurements. When the predicted state covariance matrix is modified towards smaller values, e.g. towards zero, the predicted measurements, $H_k X_k(-)$, are trusted more and more while the actual measurements, Zk, are trusted less and less. In other words, in this case the actual measurements, Zk, have less and less influence on the predicted measurements, $H_k X_k(-)$ and the filter becomes more suitable for slow motion such as tectonic drift. On the other hand, when the predicted state covariance matrix is modified towards larger values, the actual measurements, Zk, have more and more influence on the predicted measurements, $H_k X_k(-)$ and the filter becomes more suitable for fast or sudden motion. Thus, the predicted state covariance matrix, Pk(−) can be seen as constituting or at least incorporating the convergence parameter.

Moreover, since the actual measurements should generally reflect the true state to a desired degree, the desired degree of influence can be set by injecting some uncertainty into the process via the system noise covariance matrix, $Q_{k,k-1}$. Thus, the system noise covariance matrix Qk,k−1 may be used as convergence parameter and adjusted as described with regard to the other embodiments.

In one example it is considered sufficient to assume the system noise covariance matrix for the position states as:

$$Q_{k,k-1} = q\Delta t I_3 \qquad (6)$$

with
- q the expected residual error in the deformation models (meters²/second)
- $\Delta t$ $t_k - t_{k-1}$ (seconds)
- $I_3$ 3×3 identity matrix In this case the parameter q in equation 6 can be used to determine the convergence parameter.

The parameter q in the present example can directly be set based on the determined displacement of the tracking device and adjusted as described with regard to the other embodiments. Here, the time interval $\Delta t = t_k - t_{k-1}$ constitutes the predetermined constant multiplied with the parameter q to finally obtain the convergence parameter.

For example, in the absence of any other disturbing forces q can be set to a default value of about (2 cm)²/year or 1.3e−11 m²/second. However, if there are sudden changes in the position of the antenna due to an earthquake or landslide, q can be adapted to reflect the dynamics of the situation, as disclosed in the other embodiments. As q is increased new measurements will be given more weight and the Kalman filter will be better able to track the true position of the antenna through the event. When the tracking device is again stationary q can be reduced, e.g. to the default value and the Kalman filter will converge further to the new antenna position.

In the following a further embodiment of the invention will be described with regard to FIG. 4.

Figure 4:
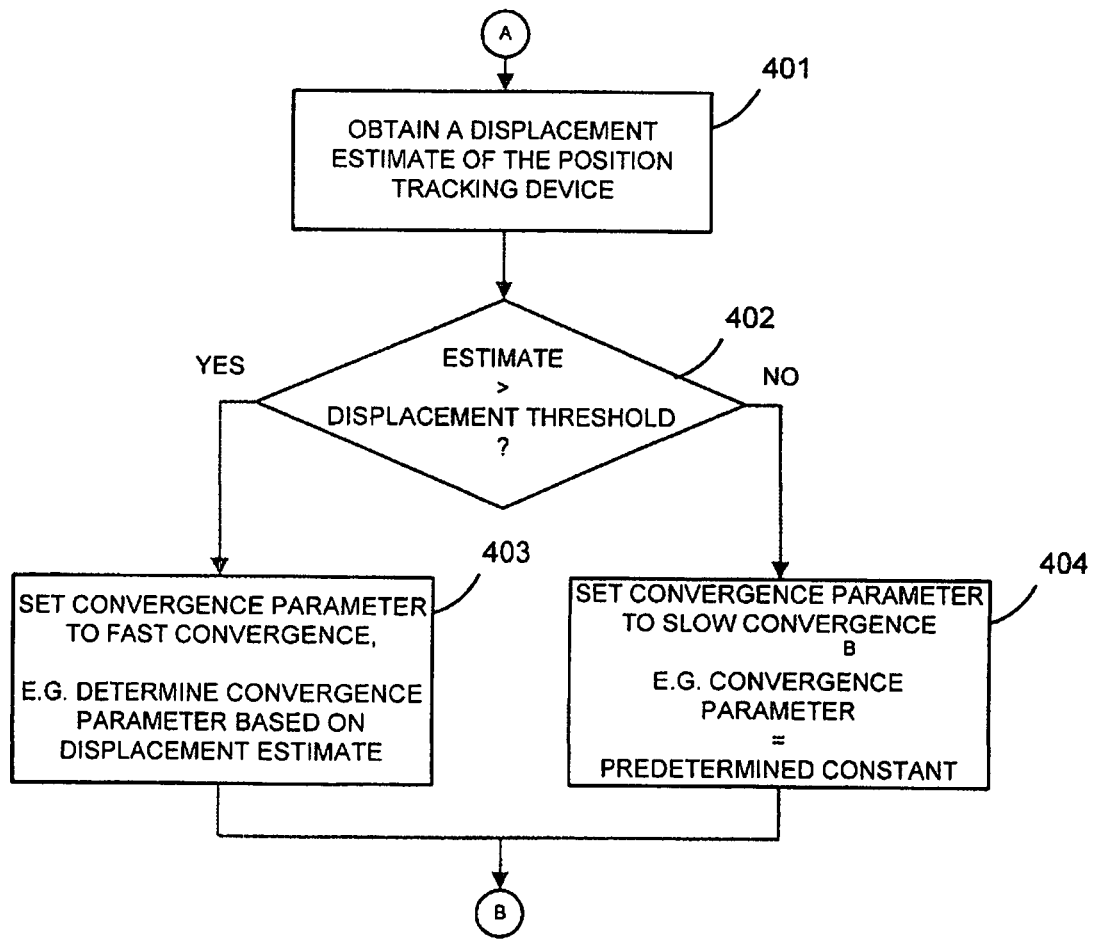
FIG. 4 shows operations of a method for tracking a position according to another embodiment of the invention, particularly outlining operations to adjust a conversion's parameter based on a detected motion.

FIG. 4 particularly illustrates operations for setting a convergence parameter on the basis of the magnitude of a detected displacement, in order to distinguish between the stationary or slow moving state and the non-stationary or fast moving state.

The embodiment of FIG. 4 only illustrates operations for setting the convergence parameter, and thus operations of FIG. 4 may start from an exit point A in FIG. 2, i.e. after operation 201 of FIG. 2, or start at an exit point A of FIG. 3, i.e., after operation 301 of FIG. 3. After determining the convergence parameter in accordance with the embodiment of FIG. 4, operations may continue at entry point B of FIG. 2, i.e. after operation 203, or at entry point B of FIG. 3, i.e. after operation 303 of FIG. 3.

In a first operation 401 a displacement estimate of the position tracking device is obtained, such as outlined with regard to previous embodiments.

In an operation 402 it is decided whether the displacement estimate exceeds a displacement threshold. The displacement threshold used in operation 402 preferably is set such that it distinguishes between slow motions such as occurring during normal times of operation, i.e. slow deformations of the earth surface, from fast motion, such as occurring during an earthquake or landslide.

In an operation 402 it is determined that the displacement estimate exceeds the displacement threshold, i.e. if the decision operation 402 is "YES", in an operation 403 the convergence parameter is set to indicate fast convergence. In an operation 402 the decision is "NO", i.e. if the displacement estimate does not exceed the displacement threshold, the convergence parameter is set to indicate a slow convergence of the recursive filter, such as the Kalman filter of FIG. 3.

Thereafter the flow of operations continues, such as outlined with regard to previous embodiments, e.g. with operation 201 in FIG. 2, i.e. the next cycle for position estimation, or operation 305 of FIG. 3.

For example, in operation 403, for indicating fast convergence, the convergence parameter may be set based on the displacement estimate, e.g. by appropriately processing the displacement estimate such as outlined before. For example, to avoid false alarms due to single displacement estimates exceeding the threshold, a sequence of displacement estimates may be filtered, such as low pass filtered, or a mean value of a predetermined number of sequential displacement estimates may be computed.

According to another example, an operation 404, to set the convergence parameter to indicate slow convergence of the recursive filter, the convergence parameter may be set equal to a predetermined constant, indicating that very small variations of the measurements are expected.

In an example in an operation 403 the displacement estimate when using a Kalman filter may be constituted by a velocity vector describing a movement of the position tracking device. Thus, in this case the Kalman filter may quickly follow swift variations of the position of the tracking device. Likewise, in operation 404 the convergence parameter may be set to a small value, indicating low position noise for the Kalman filter making the assumption that the stations are essentially static.

The embodiment of FIG. 4 enables an improved position estimation during times of slow movement with the convergence of the filter guided by a constant and improved position estimation during times of swift movement with the convergence of the filter adaptive on the basis of the detected displacement.

Figure 5:
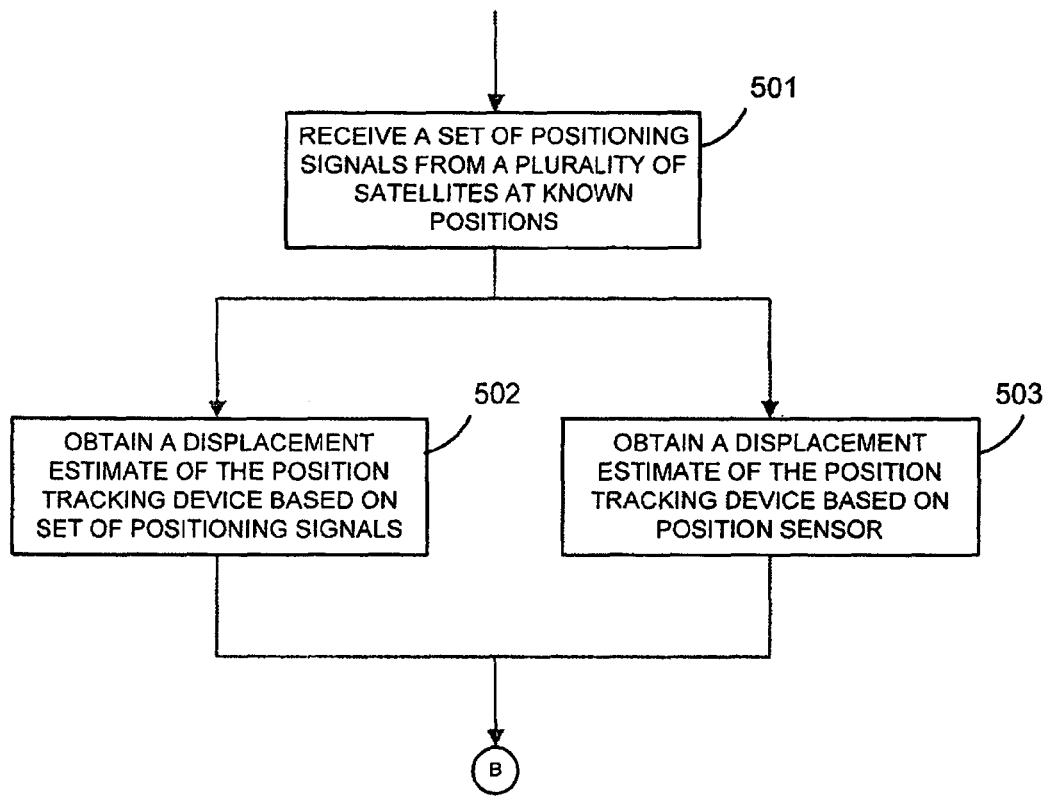
FIG. 5 illustrates operations of a method for tracking a position according to another embodiment of the invention, particularly illustrating operations for obtaining a displacement estimate.

In the following a further embodiment of the invention will be outlined with regard to FIG. 5. FIG. 5 illustrates operations of a method for provision tracking, particularly illustrating examples to obtain a displacement estimate at the position tracking device.

In a first operation 501 a set of positioning signals from a plurality of satellites at known positions are received, such as outlined with regard to previous embodiments.

In an operation 502 displacement estimate of the position tracking device may be obtained on the basis of the set of positioning signals. In an example, the displacement estimate is determined on the basis of a phase of the signals from the satellites. Differentiating the phase of the signals received from the individual satellites leads to a quantity indicating the change of the phase overtime and thus relates to a displacement of the tracking device. Performing such detection of phase variations in the signals from the individual satellites enables the tracking device to determine a displacement in the different directions, i.e. latitude, longitude and altitude. Of course, the displacement of the tracking device may also be calculated in any other coordinate system.

Alternatively, as shown in operation 503 the displacement estimate of the position tracking device may be obtained from a position sensor, such as an acceleration sensor or any other kind of gravity or displacement sensor. The position sensor may be directly attached to the position tracking device, forming an integral part thereof or may be positioned at an external location. While operations 501 and 503 are shown as distinct alternatives, both may also be combined in a single embodiment. In another example the displacement estimate is obtained from a time sequence of displacement measurements, such as by averaging a sequence of displacement estimates or by low pass filtering a sequence of displacement estimates, in order to obtain a reliable displacement estimate.

In the following, a further embodiment of the invention will be outlined with regard to FIG. 6.

Figure 6:
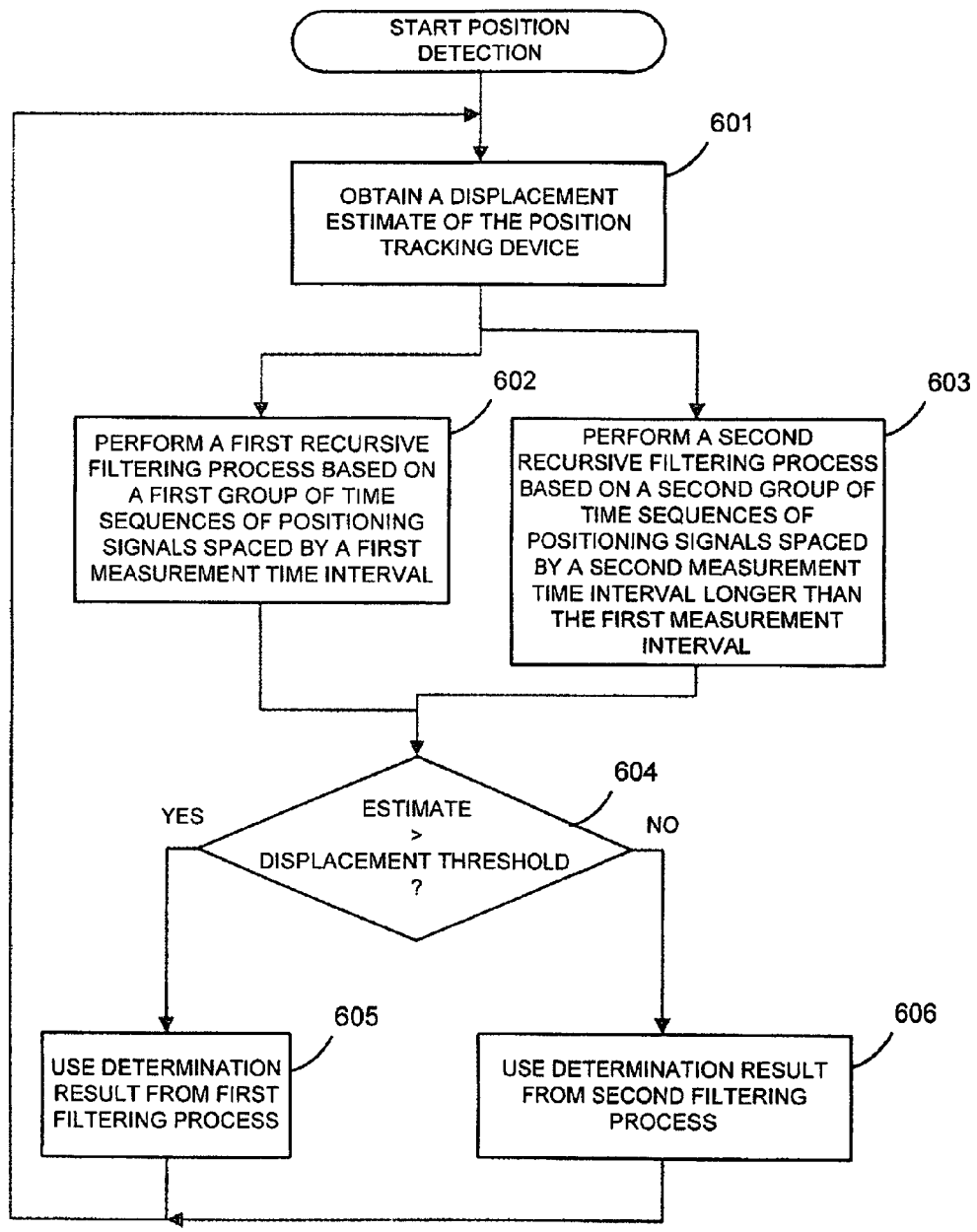
FIG. 6 illustrates operations of a method for tracking a position according to another embodiment of the invention, particularly outlining operations to simultaneously perform slow and rapid motion detection using two filter processes.

FIG. 6 illustrates operations for performing a position tracking, particularly outlining operations for improving the adaptability of the tracking device to changing environments by performing parallel position tracking cycles at different time intervals.

In a stationary or almost stationary environment such due to slow motion on measuring a earth deformation, position estimation cycles may only be needed at a low rate, e.g. once per second, or once per hour or even once per days. A more frequent position estimation may not in this case improve the detection process, as measurement errors would influence the result.

On the other hand, during times of rapid motion, a more frequent position estimation will be required, in order to be able to track the movements, and position estimations may have to be carried out at a high rate, such as 1-50 times per second.

While according to an embodiment it is possible to modify the rate of the estimation process based on the displacement estimate, with a higher rate upon larger displacement estimates and a lower position estimation rate upon small or no displacements of the tracking device.

However, as the Kalman filter requires some time to adapt to a change of the position estimation rate, i.e. to adapt to a low rate when previously a higher rate was used and vice versa, the present embodiment discloses a parallel Kalman filtering process at different rate, with a first process having a higher rate and a second process having a lower rate.

In operation 601 a displacement estimate of the position tracking device is obtained, such as outlined with regard to previous embodiments.

In an operation 602 accordingly a first recursive filtering process, such as Kalman filter process is performed based on a first group of time sequences of positioning signals based by a first measurement time interval.

Parallel thereto, in an operation 603 a second recursive filtering process such as a common filtering process is performed based on a second group of time sequences of positioning signals spaced by a second measurement time interval longer than the first measurement interval. It is noted that operation 601 and 602 respectively include operations for adjusting or updating an associated convergence parameter at the respective rates, such as outlined with regard to previous embodiments.

Accordingly, the first and second recursive filtering processes both perform a position tracking, however, at different position estimation rates.

In an operation 604 it is determined whether the displacement estimate exceeds a displacement threshold and in operation 604 the decision is "YES" the determination result from the first filtering process is used in an operation 605. If an operation 604 the decision is "NO", if the displacement estimate does not exceed the displacement threshold in an operation 606, the determination result from the second filtering process is used.

Accordingly, during times of slow motion the filtering process with the lower rate and responding the longer time interval is used, whereas during times of rapid movement the recursive filtering process at the higher rate or smaller measurement time interval is used. Accordingly, upon detecting rapid motion events, such as an earthquake, the optimally suitable filtering process can be employed.

In the following, a further embodiment of the invention will be outlined with regard to FIG. 7.

Figure 7:
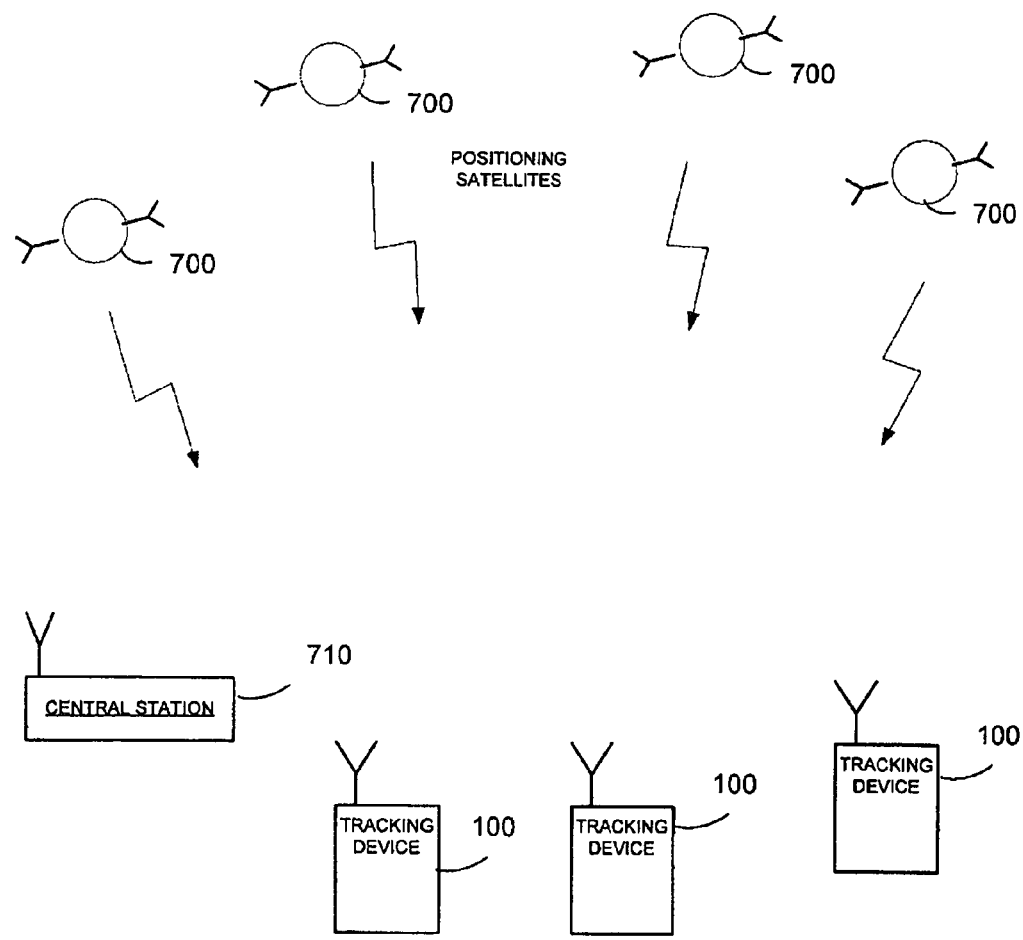
FIG. 7 illustrates a system for detecting slow deformations and rapid motion according to an embodiment of the invention.

FIG. 7 illustrates a system for detecting slow deformations and rapid motion.

The system includes a plurality of position tracking devices 100 such as described with regard to the previous embodiments. The position tracking devices 100 receive positioning signals from the plurality of satellites 700 and each compute position estimates on the basis of the received signals as outlined with regard to previous embodiments. The position estimates are transmitted to a central station 710, e.g. in a wireless or wirebound communication, enabling a central processing or collection of the measurement data.

The plurality of position tracking devices is combined in a network, possibly with large spacing between the individual position tracking devices, enabling the qualification of tectonic movements while at the same time being able to track and consider rapid movements such as earthquakes.

According to another embodiment a program can be provided including instructions adapted to cause data processing means to carry out a method with the features of the above described embodiments.

According to another example a computer readable medium embodying the program may be provided.

According to another embodiment a computer program product may comprise the computer readable medium.

According to another embodiment an optical instrument is provided comprising the calibration error correction device.

According to another embodiment an optical instrument is provided, calibrated in accordance with the above method steps of the above described embodiments.

According to another embodiment a position tracking device is provided, including
- a receiver of positioning signals from a plurality of satellites at known positions,
- a processing unit,
- a memory,
- wherein the memory stores the positioning signals, a convergence parameter, a displacement estimate of the position tracking device, and program elements for execution on the processing unit to determine the position estimate using a recursive filter using the positioning signals and the convergence parameter and to adjust the convergence parameter based on the displacement estimate.

Moreover, in another example the memory stores as the recursive filter a Kalman filter program, wherein the convergence parameter is constituted by a position noise input to the Kalman filter.

In another example the memory stores a program element to multiply the displacement estimate by a constant and to store the result as the convergence parameter.

In another example the memory stores a program element to determine the displacement estimate based on one of
- a time sequence of displacement measurements.
- a phase of the positioning signals from the T satellites; and
- a signal from a motion sensor.

In another example the memory stores velocity vector describing a movement of the position tracking device as a displacement estimate.

In another example the memory stores a program element to set the convergence parameter to a value indicating slow convergence, if the displacement estimate is below a predetermined detect threshold, and to set the convergence parameter to a value indicating fast convergence, if the displacement estimate exceeds the predetermined detect threshold.

In another example the memory stores a program element to determine, for indicating fast convergence, the convergence parameter based on the displacement estimate and, for indicating slow convergence, to determine the convergence parameter as a predetermined constant.

In another example the memory stores program elements to perform a first recursive filtering process based on a first group of time sequences of positioning signals spaced by a first measurement time interval, to perform a second recursive filtering process based on a second group of time sequences of positioning signals spaced by a second measurement time interval longer than the first measurement interval, and to use the determination result of the first recursive filtering process, if the displacement estimate exceeds a predetermined threshold, and to use the determination result of the second recursive filtering process, if the displacement estimate is below the predetermined threshold.

In another example the memory stores a program element to determine the convergence parameter including covariances of a displacement in different spatial directions.

The invention claimed is:

1. Position tracking device, including
   means for receiving positioning signals from a plurality of satellites at known positions;
   means for determining a position estimate using a recursive filter adapted to receive as an input the positioning signals and a convergence parameter to adapt the filter characteristic of the recursive filter;
   means for obtaining a displacement estimate of the position tracking device;
   wherein the means for determining the position estimate is adapted to adjust the convergence parameter based on the displacement estimate to indicate a first velocity state of the position tracking device and a second velocity state of the position tracking device.

2. Position tracking device according to claim 1, wherein the recursive filter is a Kalman filter and wherein the convergence parameter is constituted by a position noise input to the Kalman filter.

3. Position tracking device according to claim 2, wherein the convergence parameter is constituted by the displacement estimate multiplied by a constant.

4. Position tracking device according to claim 3, wherein the displacement estimate is determined based on at least one of:
   a time sequence of displacement measurements;
   a velocity vector describing a movement of the position tracking device;
   a phase of the positioning signals from the satellites; and
   a signal from a motion sensor.

5. Position tracking device according to claim 1, wherein the means for determining a position estimate is adapted to set the convergence parameter to a value indicating slow convergence, if the displacement estimate is below a predetermined detect threshold, and to set the convergence parameter to a value indicating fast convergence, if the displacement estimate exceeds the predetermined detect threshold.

6. Position tracking device according to claim 1, wherein for indicating fast convergence the convergence parameter is determined based on the displacement estimate and for indicating slow convergence the convergence parameter is constituted by a predetermined constant.

7. Position tracking device according to claim 1, wherein the means for determining a position estimate is adapted to:
   perform a first recursive filtering process based on a first group of time sequences of positioning signals spaced by a first measurement time interval;
   perform a second recursive filtering process based on a second group of time sequences of positioning signals spaced by a second measurement time interval longer than the first measurement interval; and
   use the determination result of the first recursive filtering process, if the displacement estimate exceeds a predetermined threshold, and to use the determination result of the second recursive filtering process, if the displacement estimate is below the predetermined threshold.

8. Position tracking device according to claim 1, wherein the convergence parameter includes covariances of a displacement in different spatial directions.

9. System for tracking tectonic drifts including a plurality of position tracking devices according to claim 1.

10. Position tracking device according to claim 1, wherein the first velocity state represents a stationary state of the position tracking device and the second velocity state represents a non-stationary state of the position tracking device.

11. Position tracking device according to claim 1, wherein the first velocity state represents a slow moving state of the position tracking device and the second velocity state represents a fast moving state of the position tracking device.

12. Method for tracking a position, including
   receiving positioning signals from a plurality of satellites at known positions at a position tracking device;
   obtaining a displacement estimate of the position tracking device;
   adjusting a convergence parameter based on the displacement estimate; and
   determining a position estimate using a recursive filter receiving as an input the positioning signals and the convergence parameter to indicate a first velocity state of the position tracking device and a second velocity state of the position tracking device.

13. Method of claim 12, wherein the recursive filter is a Kalman filter and wherein the convergence parameter is constituted by a position noise input to the Kalman filter.

14. Method of claim 12, further including determining the convergence parameter by multiplying the displacement estimate with a constant.

15. Method of claim 12, further including determining the displacement estimate based on at least one of:
   a time sequence of displacement measurements;
   a velocity vector describing a movement of the position tracking device;
   a phase of the positioning signals from the satellites; and
   a signal from a motion sensor.

16. Method of claim 12, further including setting the convergence parameter to a value indicating slow convergence, if the displacement estimate is below a predetermined detect threshold, and setting the convergence parameter to a value indicating fast convergence, if the displacement estimate exceeds the predetermined detect threshold.

17. Method of claim 12, further including determining the convergence parameter based on the displacement estimate for indicating fast convergence of the convergence parameter and defining the convergence parameter as a predetermined constant for indicating slow convergence.

18. Method of claim 12, further including:
   performing a first recursive filtering process based on a first group of time sequences of positioning signals spaced by a first measurement time interval;
   performing a second recursive filtering process based on a second group of time sequences of positioning signals spaced by a second measurement time interval longer than the first measurement interval; and
   using the determination result of the first recursive filtering process, if the displacement estimate exceeds a predetermined threshold, and using the determination result of the second recursive filtering process, if the displacement estimate is below the predetermined threshold.

19. Method of claim 12, wherein the convergence parameter includes covariances of a displacement in different spatial directions.

20. A non-transitory computer readable medium, in which a program is embodied, where the program is adapted to make a computer execute the method of claim 12.

21. A computer program product comprising the non-transitory computer readable medium according to claim 20.

22. Method of claim 12, wherein the first velocity state represents a stationary state of the position tracking device and the second velocity state represents a non-stationary state of the position tracking device.

23. Method of claim 12, wherein the first velocity state represents a slow moving state of the position tracking device and the second velocity state represents a fast moving state of the position tracking device.

24. Position tracking device, comprising:
   a receiver to receive positioning signals from a plurality of satellites at known positions;
   a recursive filter adapted to determine a position estimate using the positioning signals and a convergence parameter to adapt the filter characteristics of the recursive filter; and
   a displacement estimation unit to obtain a displacement estimate of the position tracking device;
   wherein the recursive filter is adapted to adjust the convergence parameter based on the displacement estimate to indicate a first velocity state of the position tracking device and a second velocity state of the position tracking device.

25. Position tracking device according to claim 24, wherein the recursive filter is a Kalman filter and wherein the convergence parameter is constituted by a position noise input to the Kalman filter.

26. Position tracking device according to claim 24, wherein the convergence parameter is constituted by the displacement estimate multiplied by a constant.

27. Position tracking device according to claim 24 wherein the displacement estimate is determined based on at least one of:
   a time sequence of displacement measurements;
   a phase of the positioning signals from the satellites;
   a signal from a motion sensor; and
   a velocity vector describing a movement of the position tracking device.

28. Position tracking device according to claim 24, wherein the convergence parameter is set to a value indicating slow convergence if the displacement estimate is below a predetermined detect threshold, and to value indicating fast convergence if the displacement estimate exceeds the predetermined detect threshold.

29. Position tracking device according to claim 24, wherein for indicating fast convergence the convergence parameter is determined based on the displacement estimate and for indicating slow convergence the convergence parameter is constituted by a predetermined constant.

30. Position tracking device according to claim 24, wherein the recursive filter is adapted to:
   perform a first recursive filtering process based on a first group of time sequences of positioning signals spaced by a first measurement time interval;
   perform a second recursive filtering process based on a second group of time sequences of positioning signals spaced by a second measurement time interval longer than the first measurement interval; and
   use the determination result of the first recursive filtering process if the displacement estimate exceeds a predetermined threshold, and to use the determination result of the second recursive filtering process if the displacement estimate is below the predetermined threshold.

31. Position tracking device according to claim 24, wherein the convergence parameter includes covariances of a displacement in different spatial directions.

32. Position tracking device according to claim 24, wherein the first velocity state represents a stationary state of the position tracking device and the second velocity state represents a non-stationary state of the position tracking device.

33. Position tracking device according to claim 24, wherein the first velocity state represents a slow moving state of the position tracking device and the second velocity state represents a fast moving state of the position tracking device.

* * * * *